United States Patent [19]

Yasui et al.

[11] Patent Number: 5,161,228
[45] Date of Patent: Nov. 3, 1992

[54] SYSTEM WITH SELECTIVELY EXCLUSIONARY ENABLEMENT FOR PLURAL INDIRECT ADDRESS TYPE INTERRUPT CONTROL CIRCUIT

[75] Inventors: Takashi Yasui, Kobe; Masanobu Fukushima, Toyonaka; Kazuhiko Hara, Takatsuki, all of Japan

[73] Assignee: Ricoh Company, Ltd., Tokyo, Japan

[21] Appl. No.: 317,808

[22] Filed: Mar. 2, 1989

[30] Foreign Application Priority Data

Mar. 2, 1988 [JP] Japan ................. 63-48957

[51] Int. Cl.$^5$ .................................................. G06F 9/46
[52] U.S. Cl. ................... 395/725; 364/241.2; 364/242.2; 364/259.7; 364/241.6; 364/DIG. 2; 395/425
[58] Field of Search ... 364/200 MS File, 900 MS File; 395/725, 425

[56] References Cited

U.S. PATENT DOCUMENTS

| | | | |
|---|---|---|---|
| 3,665,415 | 5/1972 | Beard | 364/200 |
| 3,676,861 | 7/1972 | Ruth | 364/200 |
| 4,020,472 | 4/1977 | Bennett | 364/200 |
| 4,028,663 | 6/1977 | Royer | 364/900 |
| 4,068,305 | 1/1978 | Cutler | 364/200 |
| 4,205,374 | 5/1980 | Bardsley | 364/200 |
| 4,245,308 | 1/1981 | Hirshmann | 364/200 |
| 4,358,829 | 11/1982 | Branigin | 364/900 |
| 4,396,984 | 8/1983 | Videki | 364/200 |
| 4,420,806 | 12/1983 | Johnson | 364/200 |
| 4,734,882 | 3/1988 | Romagosa | 364/900 |
| 4,779,195 | 10/1988 | James | 364/200 |
| 4,803,613 | 2/1989 | Kametani | 364/200 |

Primary Examiner—Thomas C. Lee
Assistant Examiner—Eric Coleman
Attorney, Agent, or Firm—Cooper & Dunham

[57] ABSTRACT

An indirect address type interrupt control circuit is provided. A plurality of interrupt control units are provided for receiving an input interrupt signal and generating a vector address which corresponds to the interrupt signal. Also provided in the circuit is a control unit which responds to the input interrupt signal to cause only one of the plurality of interrupt control units which corresponds to the interrupt signal to be rendered operative. With this structure, the number of interrupt request signals can be increased or decreased with ease.

4 Claims, 7 Drawing Sheets

SYSTEM WITH SELECTIVELY EXCLUSIONARY ENABLEMENT FOR PLURAL INDIRECT ADDRESS TYPE INTERRUPT CONTROL CIRCUIT

BACKGROUND OF THE INVENTION

1. Field of the Invention

This invention generally relates to an interrupt control circuit and in particular to an indirect type interrupt control circuit.

2. Description of the Prior Art

FIG. 2 shows in block form a direct address type interrupt control circuit (hereinafter, also referred to as a first prior art example) using a programmable interrupt controller integrated circuit model M5L8259 manufactured by Mitsubishi Electric Company. In FIG. 2, there are provided three M5L8259 integrated circuits 41 through 43 which are coupled to a central processing unit (CPU), a random access memory (RAM) and an associated peripheral circuit, which are not shown, through address, control and data buses. An interrupt request signal generated by the peripheral circuit is input into the integrated circuits 42 and 43 serving as slave controllers and an interrupt request signal output from the integrated circuits 42 and 3 is supplied to the integrated circuit 41 serving as a master controller. And, the master controller integrated circuit 41 outputs an integrated interrupt request signal to the control bus. The master controller integrated circuit 41 controls the operation of the slave controller integrated circuits 42 and 43 using signals on cascade lines $CAS_0$, $CAS_1$ and $CAS_2$ to grant an interrupt to each of the circuits 42 and 43.

Alternatively, there has been proposed an indirect address type interrupt control integrated circuit model MC6828 for use in M6800 system manufactured by Motolora (hereinafter, also referred to as a second prior art example). This integrated circuit has eight interrupt input terminals and selects one of the interrupt signals input into these eight interrupt input terminals in accordance with a predetermined interrupt priority level to thereby output the thus selected single interrupt signal.

However, since the interrupt control integrated circuit of the above-described second prior art example has only eight interrupt input terminals, it cannot accept an interrupt input signal which requires more than eight interrupt input terminals. In the interrupt control integrated circuit of the first prior art example, the number of interrupt request signals may be increased by providing more slave controller integrated circuits, but this interrupt control circuit can only be used in a direct address type system and it cannot be used in an indirect address system, such as M6800 system.

SUMMARY OF THE INVENTION

In accordance with the present invention, there is provided an indirect address type interrupt control circuit which comprises a plurality of interrupt control means for receiving an input interrupt signal and generating a vector address corresponding to said interrupt signal. The present circuit also includes control means responsive to said input interrupt signal for causing only one of said plurality of interrupt control means which correspond to said interrupt signal to be operative.

With the structure of the present invention, a plurality of interrupt control means receive an input interrupt signal and generate a vector address corresponding to the interrupt signal. And, the control means responds to the interrupt signal input thereto to cause only one of the plurality of interrupt control means which corresponds to the interrupt signal to be operative. Therefore, in accordance with the present invention, since a plurality of interrupt control means can be provided, the number of interrupt request signals can be easily increased or reduced and each of the interrupt control means may receive the input signal thus input to thereby produce a vector address which corresponds to the interrupt signal. Accordingly, the present invention can be suitably and conveniently applied to an indirect address system.

It is therefore a primary object of the present invention to obviate the disadvantages of the prior art as described above and to provide an improved interrupt control circuit.

Another object of the present invention is to provide an improved indirect address type interrupt control circuit.

A further object of the present invention is to provide an improved interrupt control circuit in which the number of interrupt request signals can be changed easily.

Other objects, advantages and novel features of the present invention will become apparent from the following detailed description of the invention when considered in conjunction with the accompanying drawings.

DESCRIPTION OF THE PREFERRED EMBODIMENTS

Figure 1A:
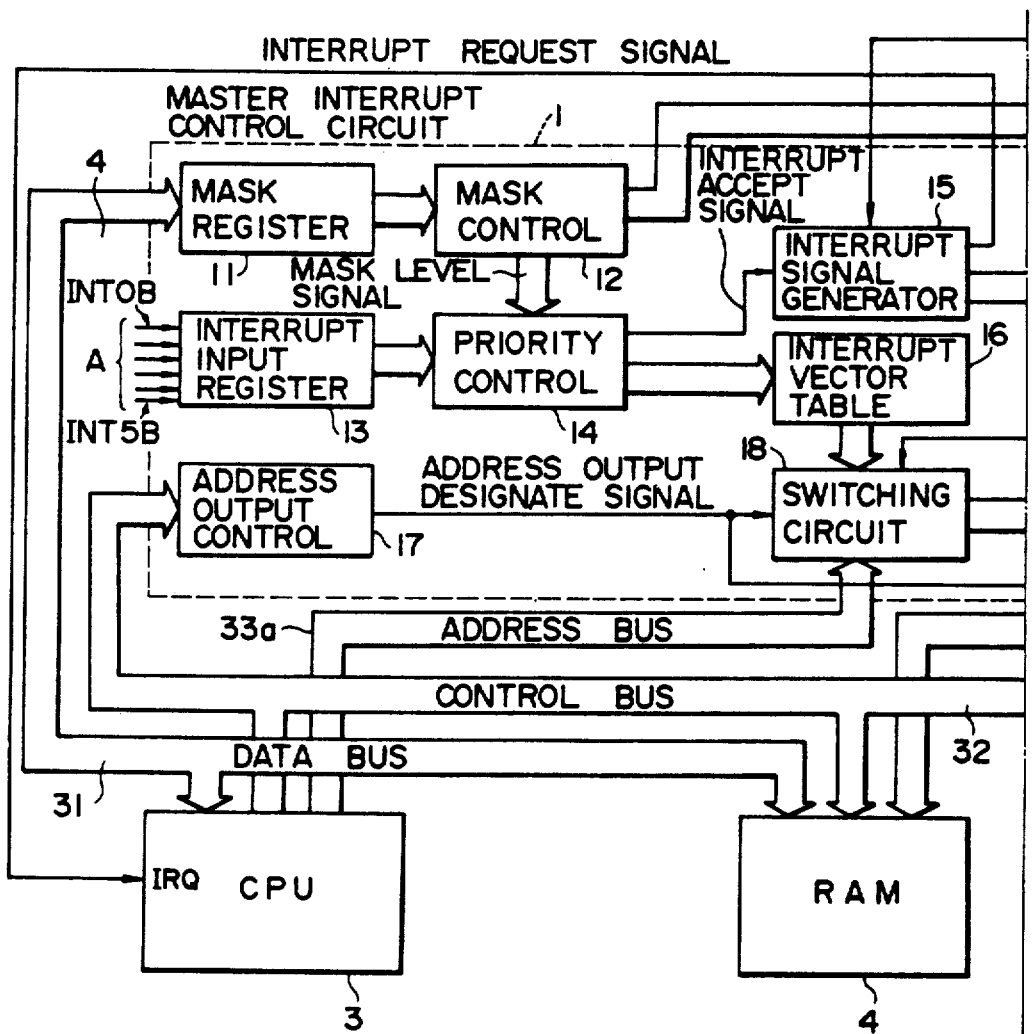
FIGS. 1A, 1B and 1C, when assembled as shown in FIG. 1, are a block diagram showing an indirect address type interrupt control circuit constructed in accordance with one embodiment of the present invention.
Figure 1:
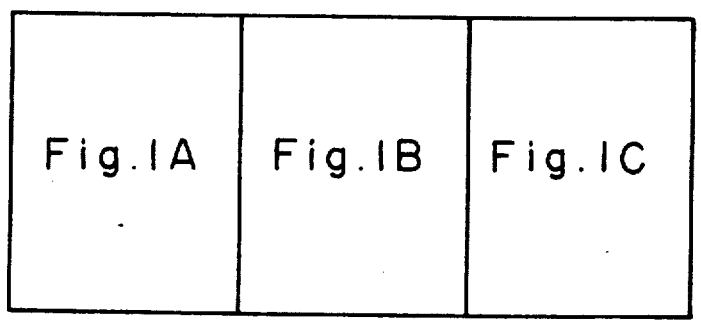
Figure 1B:
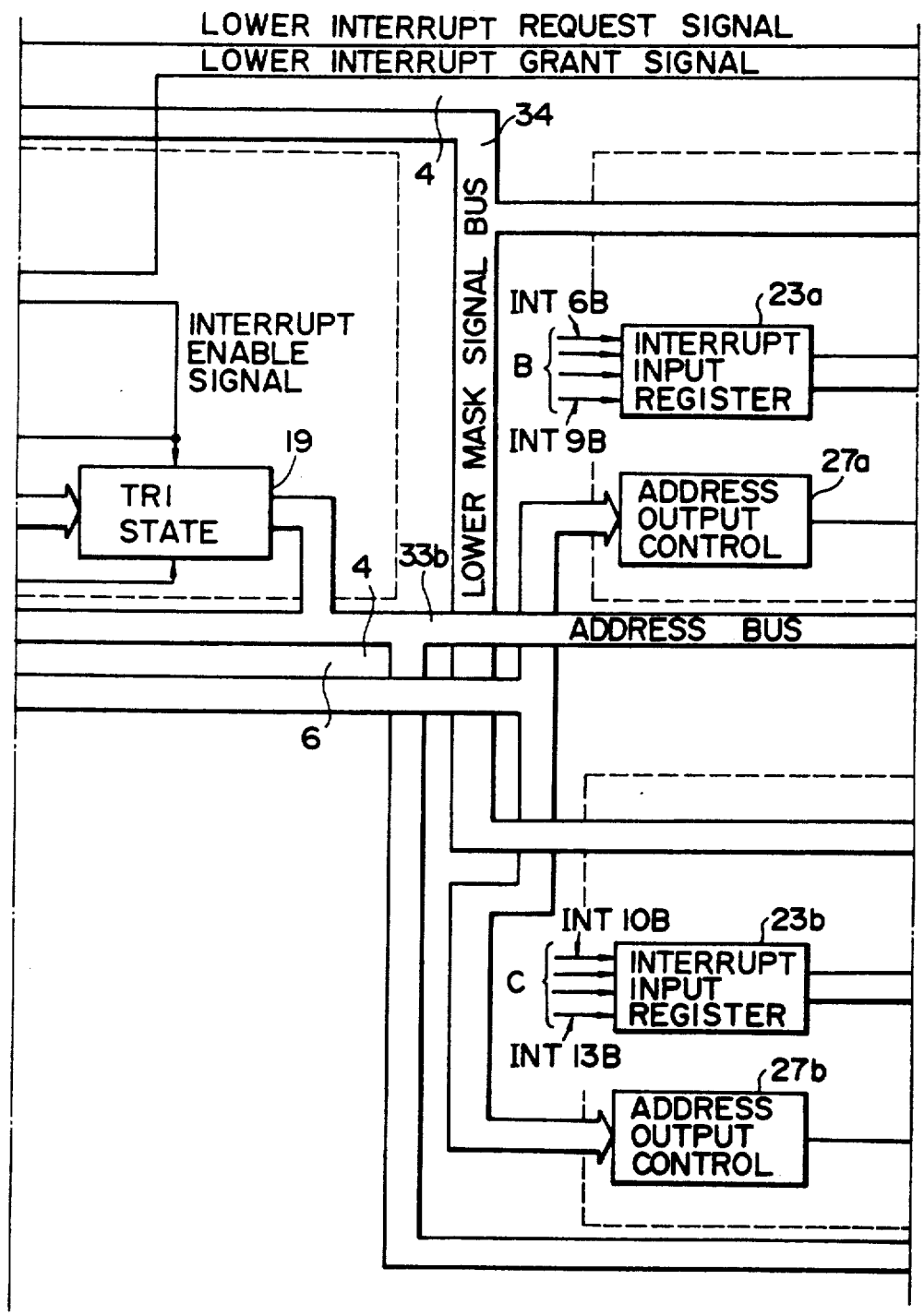
Figure 1C:
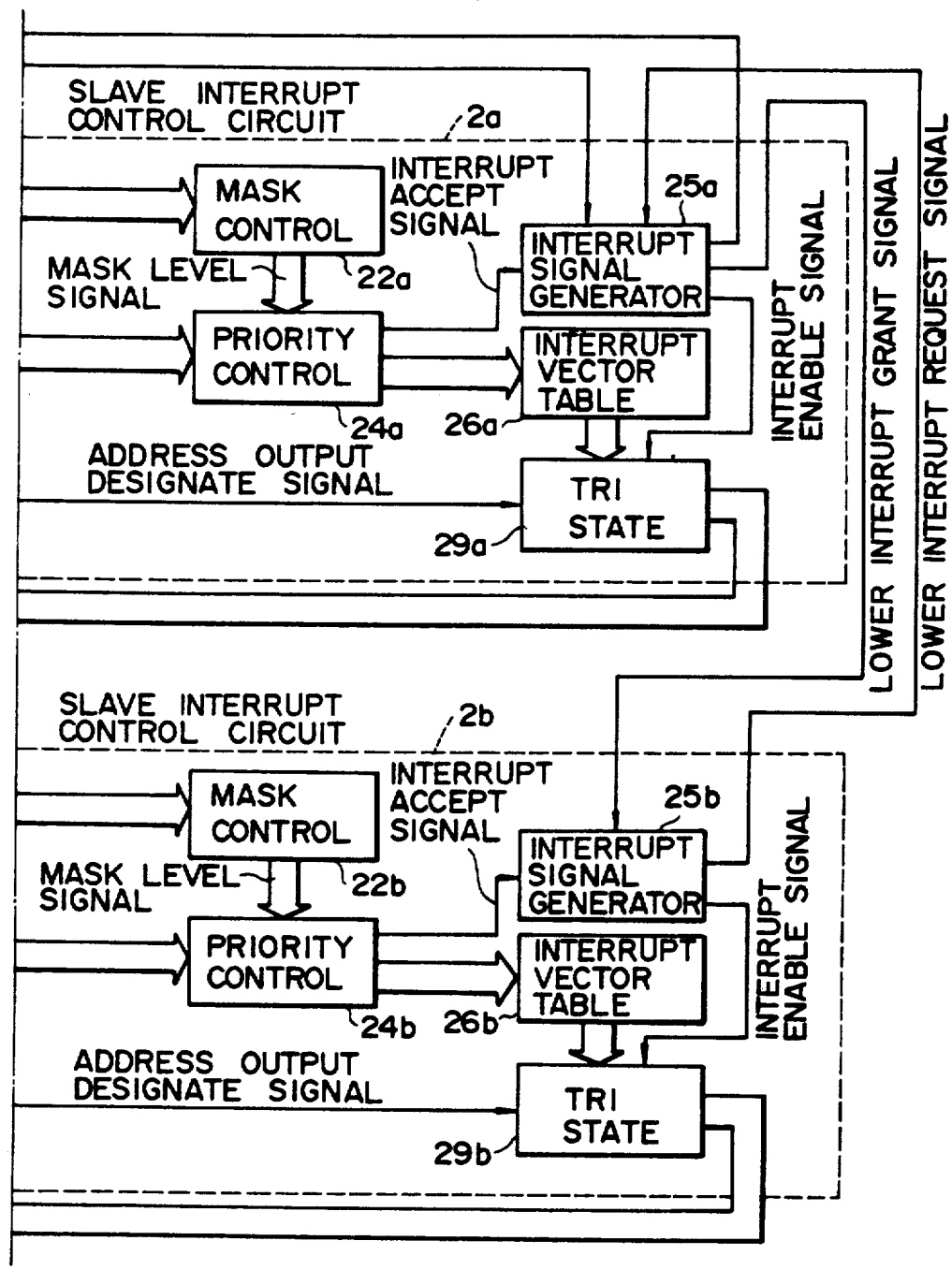
Figure 2:
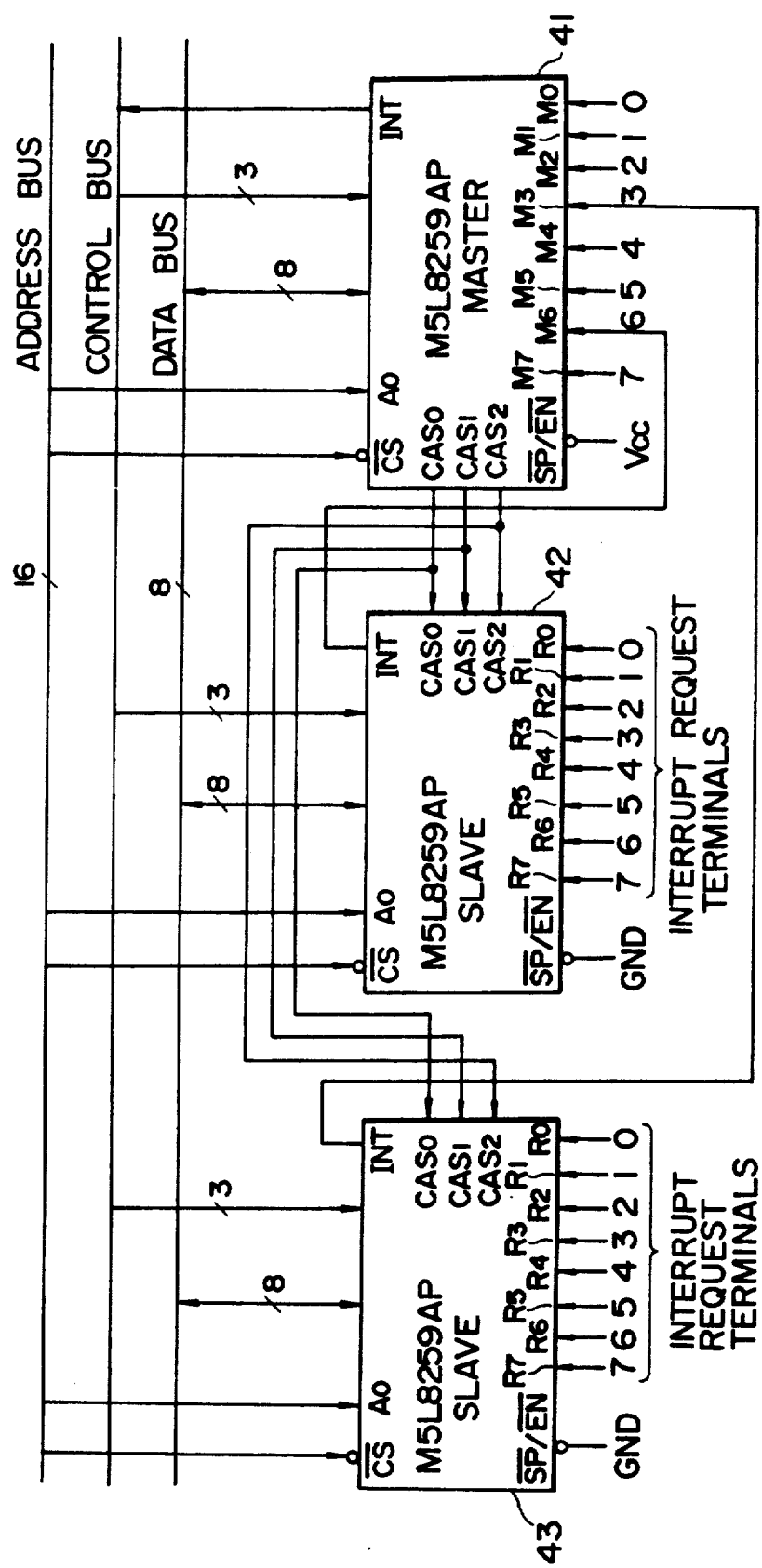
FIG. 2 is a block diagram showing a typical prior art direct address type interrupt control circuit.

Referring now to FIG. 1, there is shown in block form an indirect address type interrupt control circuit constructed in accordance with one embodiment of the present invention. This interrupt control circuit includes a master interrupt control circuit 1 which has six interrupt input terminals INT0B through INT5B and controls a pair of slave interrupt control circuits 2a and 2b which have, respectively, four interrupt input terminals INT6B through INT9B and INT10B through INT13B and which are controlled by the master interrupt control circuit 1.

These master and slave interrupt control circuits 1, 2a and 2b are connected to a central processing unit (CPU) 3 and a random access memory (RAM) 4 through a data bus 31 and a control bus 32. The present interrupt control circuit is characterized in that the number of interrupt input terminals can be increased simply by providing more slave interrupt control circuits.

A 4-bit address signal output from the CPU 3 is supplied to the RAM 4 through an address bus 33a, a switching circuit 18 and a tri-state output circuit 19 of a master interrupt control circuit 1 and an address bus 33b. A vector address signal output from each of the interrupt control circuits 1, 2a and 2b is output to the RAM 4 through the address bus 33b.

In this interrupt control circuit, a 4-bit interrupt mask data which is shown in table 1 below and which determines an interrupt mask level is input into the mask register 11 of the master interrupt control circuit 1 from the CPU 3 and stored therein, and, then, it is output to the mask control circuit 12. In response thereto, the mask control circuit 12 causes a 4-bit lower interrupt mask signal, which is shown in table 1 and becomes the mask data of the slave interrupt control circuits 2a and 2b, to be output to each of the mask control circuits 22a and 22b of the slave interrupt control circuits 2a and 2b through a lower mask signal bus 34.

Each of the mask control circuits 22a and 22b of the respective slave interrupt control circuits 2a and 2b outputs a mask level signal of interrupt input terminal INT6B through INT9B and interrupt input terminal INT10B through INT13B in accordance with an input lower mask signal to the priority control circuit 24a and 24b. On the other hand, after an interrupt signal has been input into the interrupt input terminal INT0B through INT5B of the interrupt input register 13 of the master interrupt control circuit 1 and once stored, the interrupt input register 13 outputs the interrupt signal to the priority control circuit 14. In response thereto, the priority control circuit 14 determines whether or not the interrupt signal thus input is to be masked by a mask level signal input from the mask control circuit 12, i.e., whether the interrupt signal thus input is above a predetermined mask level and thus reception of the interrupt

TABLE 1

| MASTER DATA | | | | INTERRUPT INPUT MASK LEVEL | | | | | | | | | | | | | | LOWER MASK SIGNAL | | | |
|---|---|---|---|---|---|---|---|---|---|---|---|---|---|---|---|---|---|---|---|---|---|
| | | | | INT0B | INT1B | INT2B | INT3B | INT4B | INT5B | INT6B | INT7B | INT8B | INT9B | INT10B | INT11B | INT12B | INT13B | MME1 | MME2 | MSK1 | MSK0 |
| M3 | M2 | M1 | M0 | | | | | | | | | | | | | | | | | | |
| 1 | 1 | 1 | 1 | 0 | 0 | 0 | 0 | 0 | 0 | 0 | 0 | 0 | 0 | 0 | 0 | 0 | 0 | 0 | 0 | 1 | 1 |
| 1 | 1 | 1 | 0 | 0 | 0 | 0 | 0 | 0 | 0 | 0 | 0 | 0 | 0 | 0 | 0 | 0 | 0 | 0 | 0 | 1 | 0 |
| 1 | 1 | 0 | 1 | 1 | 0 | 0 | 0 | 0 | 0 | 0 | 0 | 0 | 0 | 0 | 0 | 0 | 0 | 0 | 0 | 0 | 1 |
| 1 | 1 | 0 | 0 | 1 | 1 | 0 | 0 | 0 | 0 | 0 | 0 | 0 | 0 | 0 | 0 | 0 | 0 | 0 | 0 | 0 | 0 |
| 1 | 0 | 1 | 1 | 1 | 1 | 1 | 0 | 0 | 0 | 0 | 0 | 0 | 0 | 0 | 0 | 0 | 0 | 0 | 0 | 1 | 1 |
| 1 | 0 | 1 | 0 | 1 | 1 | 1 | 1 | 0 | 0 | 0 | 0 | 0 | 0 | 0 | 0 | 0 | 0 | 0 | 0 | 1 | 0 |
| 1 | 0 | 0 | 1 | 1 | 1 | 1 | 1 | 1 | 0 | 0 | 0 | 0 | 0 | 0 | 0 | 0 | 0 | 0 | 0 | 0 | 1 |
| 1 | 0 | 0 | 0 | 1 | 1 | 1 | 1 | 1 | 1 | 0 | 0 | 0 | 0 | 0 | 0 | 0 | 0 | 0 | 0 | 0 | 0 |
| 0 | 1 | 1 | 1 | 1 | 1 | 1 | 1 | 1 | 1 | 0 | 0 | 0 | 0 | 0 | 0 | 0 | 0 | 1 | 0 | 1 | 1 |
| 0 | 1 | 1 | 0 | 1 | 1 | 1 | 1 | 1 | 1 | 1 | 0 | 0 | 0 | 0 | 0 | 0 | 0 | 1 | 0 | 1 | 0 |
| 0 | 1 | 0 | 1 | 1 | 1 | 1 | 1 | 1 | 1 | 1 | 1 | 0 | 0 | 0 | 0 | 0 | 0 | 1 | 0 | 0 | 1 |
| 0 | 1 | 0 | 0 | 1 | 1 | 1 | 1 | 1 | 1 | 1 | 1 | 1 | 0 | 0 | 0 | 0 | 0 | 1 | 0 | 0 | 0 |
| 0 | 0 | 1 | 1 | 1 | 1 | 1 | 1 | 1 | 1 | 1 | 1 | 1 | 1 | 0 | 0 | 0 | 0 | 1 | 1 | 1 | 1 |
| 0 | 0 | 1 | 0 | 1 | 1 | 1 | 1 | 1 | 1 | 1 | 1 | 1 | 1 | 1 | 0 | 0 | 0 | 1 | 1 | 1 | 0 |
| 0 | 0 | 0 | 1 | 1 | 1 | 1 | 1 | 1 | 1 | 1 | 1 | 1 | 1 | 1 | 1 | 0 | 0 | 1 | 0 | 1 |
| 0 | 0 | 0 | 0 | 1 | 1 | 1 | 1 | 1 | 1 | 1 | 1 | 1 | 1 | 1 | 1 | 1 | 0 | 1 | 0 | 0 |

In table 1 above, mask data M0 through M3, mask level of each input signal and lower master signals ME1, ME2, MSK1 and MSK2 are shown. In the column showing the mask level of each interrupt signal, "1" indicates the absence of a mask, i.e., an interrupt input terminal which permits an interrupt and "0" indicates the presence of a mask, i.e., an interrupt input terminal which does not accept an interrupt. For example, if mask data M3 is "1", the lower mask signals ME1 and ME2 are "0" so that only an interrupt input into the interrupt input register 13 of the master interrupt control circuit 1 is permitted. On the other hand, if mask data M3 and M2 are "0" and "1", respectively, the lower mask signal ME1 becomes "1" and thus an interrupt input to the interrupt input register 13 of the master interrupt control circuit 1 and to the interrupt input register 23a of the slave interrupt control circuit 2a is granted. If both of the mask data M3 and M2 are "0", then the lower mask signal ME2 becomes "1" so that an interrupt input to each of the interrupt input registers 13, 23a and 23b of the respective interrupt control circuits 1, 2a and 2b is permitted. As shown in table 1 above, by changing the mask data M0 through M3, the mask level of an interrupt input can be set in the priority order of interrupt input terminals INT0B, INT1B, . . . , and INT13B.

The master control circuit 12 of the master interrupt control circuit 1 outputs a mask level signal of interrupt input signal INT01 through INT5B in accordance with an input mask data to the priority control circuit 14.

signal is granted or the interrupt signal thus input is below the predetermined mask level and thus reception of the interrupt signal is not granted. In the former case in which the input interrupt signal is not masked, the priority control circuit 14 outputs an interrupt accept signal to the interrupt generating circuit 15 and also outputs an interrupt signal to an interrupt vector table 16. In response thereto, the interrupt vector table 16 outputs a 4-bit vector address signal which corresponds to the input interrupt signal to the switching circuit 18. It is to be noted that the interrupt input registers 23a and 23b, priority control circuits 24a and 24b and interrupt vector tables 26a and 26b of the slave interrupt control circuits 2a and 2b operate similarly with the corresponding circuits 13, 14 and 16 of the above-described master interrupt control circuit 1 The interrupt vector tables 26a and 26b output 4-bit vector address signals corresponding to the input interrupt signals to tri-state output circuits 29a and 29b.

Upon receipt of an interrupt accept signal from the priority control circuit 24b, the interrupt signal generating circuit 25b of the slave interrupt control circuit 2b outputs a lower interrupt request signal to the interrupt signal generating circuit 25a of the slave interrupt control circuit 2a. When an interrupt accept signal or lower interrupt request signal has been received, the interrupt signal generating circuit 25a of the slave interrupt control circuit 2a outputs a lower interrupt request signal to the interrupt signal generating circuit 15. When an interrupt accept signal has been input from the priority control circuit 14 or a lower interrupt request signal has been input, the interrupt signal generating circuit 15 of the master interrupt control circuit 1 outputs an interrupt request signal to the CPU 3.

If an interrupt accept signal is input into the interrupt signal generating circuit 15 from the priority control circuit 14 of the master interrupt control circuit 1, the interrupt signal generating circuit 15 outputs an interrupt enable signal to the switching circuit 18 and also to the tri-state output circuit 19 and in order to inhibit interrupt in the lower interrupt control circuits 2a and 2b, outputs a low level, lower interrupt grant signal, which indicates the absence of grant for interrupt, to the interrupt signal generating circuit 25a of the slave interrupt control circuit 2a. In response thereto, the interrupt signal generating circuit 25a outputs a low level, lower interrupt grant signal to the interrupt signal generating circuit 25b of the slave interrupt control circuit 2b and stops reception of the interrupt accept signal from the priority control circuit 24a. In response to the low level, lower interrupt grant signal, the interrupt signal generating circuit 25b of the slave interrupt control circuit 2b stops reception of the interrupt accept signal from the priority control circuit 24b similarly with the circuit 25a.

If no interrupt accept signal has been input to the interrupt signal generating circuit 15 of the master interrupt control circuit 1 and a lower interrupt request signal has been input, the interrupt signal generating circuit 15 outputs a high level, lower interrupt grant signal, which indicates the presence of grant for interrupt, to the interrupt signal generating circuit 25a of the slave interrupt control circuit 2a so as to grant interrupt at the lower interrupt control circuit 2a or 2b. In response thereto, the interrupt signal generating circuit 25a, while receiving an interrupt accept signal, outputs an interrupt enable signal to the tri-state output circuit 29a while outputting a low level, lower interrupt grant signal to the interrupt signal generating circuit 25b to stop reception of the interrupt accept signal similarly as above. The interrupt signal generating circuit 25a, if it does not receive an interrupt accept signal but receives a high level, lower interrupt grant signal, outputs a high level, lower interrupt grant signal to the interrupt signal generating circuit 25b of the slave interrupt control circuit 2b, and, in response thereto, the interrupt signal generating circuit 25b, if it receives an interrupt accept signal, outputs an interrupt enable signal to the tri-state output circuit 29b.

Upon receipt of the above-described interrupt request signal, the CPU 3 causes the data of a predetermined internal register within the CPU 3 to be output to the RAM 4 through the data bus 31 and then the CPU 3 outputs an address output designate signal, which is a designate signal for outputting a vector address signal, to the address output control circuits 17, 27a and 27b through the control bus 32. In response thereto, the address output control circuit 17 outputs an address output designate signal to the switching circuit 18 and the tri-state control circuit 19, and the address output control circuits 27a and 27b output respective address output designate signals to respective tri-state output circuits 29a and 29b. The switching circuit 18 normally outputs an address signal input from the CPU 3 through the address bus 33 to the tri-state output circuit 19; whereas, when an interrupt enable signal and an address output signal are input, the switching circuit 18 outputs vector address input from the interrupt vector table 16 to the tri-state output circuit 19. If no address output designate signal is input, the tri-state output circuit 19 buffers and amplifies an address signal input from the CPU 3 through the address bus 33a and the switching circuit 18, which signal is then output to the RAM 4 through the address bus 33b. If an address output designate signal and an interrupt enable signal are input, the tri-state output circuit 19 buffers and amplifies a vector address signal input from the interrupt vector table 16 through the switching circuit 18, which signal is then output to the RAM 4 through the address bus 33b. If an address output designate signal is input and no interrupt enable signal is input, the tri-state output circuit 19 will set an output terminal in a high impedance state since a vector address signal is output from each of the tri-state output circuits 29a or 29b of the slave interrupt control circuit 2a and 2b.

If an address output designate signal and an interrupt enable signal are input, the tri-state output circuits 29a and 29b buffer and amplify a vector address signal output from the interrupt vector tables 26a and 26b, respectively, which signal is then output to the RAM 4 through the address bus 33b. On the other hand, if no interrupt enable signal is input, the tri-state output circuits 29a and 29b will render their output terminals at high impedance state.

Thus, if one of the three tri-state output circuits 19, 29a and 29b is outputting an address signal to the address bus 33b, the remaining two circuits will set their output terminals at high impedance state so that only one tri-state output circuit establishes an operative connection to the address bus 33b, whereby impedance matching is obtained and no collision of address signals will take place. The RAM 4 is controlled by the CPU 3 through a signal supplied via the control bus 32, and an address within the memory is designated by an address signal input from the address bus 33b so that a writing and reading operation of a predetermined data between the CPU 3 and the RAM 4 can be carried out through the data bus 31.

In operation, let us suppose that a 4-bit mask data of "0101" is set in the mask register 11 from the CPU 3 through the data bus 31. The mask register 11 outputs the mask data "0101" to the mask control circuit 12, and in response thereto the mask control circuit 12 outputs a mask level signal of "111111" for interrupt terminals INT0B through INT5B, which corresponds to the mask data "0101" in table 1, to the priority control circuit 14 and outputs a lower mask signal of "1001", which corresponds to the mask data "0101" in table 1, to the mask control circuits 22a and 22b. In response thereto, the mask control circuit 22a outputs a mask level signal of "1110" of interrupt terminals INT6B through INT9B corresponding to the lower mask signal "1001" to the priority control circuit 24a. Since ME2 of the lower mask signal is "0", the mask control circuit 22b does not output a mask level signal.

Now, when an interrupt signal has been input to the interrupt input terminal INT6B of the interrupt input register 23, the interrupt signal is input to the priority control circuit 24a through the interrupt input register 23a and it is determined whether or not to receive the interrupt signal. Since the mask level signal is "1110" as described above and the interrupt signal of the interrupt input terminal INT6B is not masked, the interrupt signal is received and the priority control circuit 24a outputs an interrupt accept signal to the interrupt signal generating circuit 25a while outputting the interrupt signal to the interrupt vector table 26a to thereby cause a vector address signal corresponding to the interrupt signal output to the tri-state output circuit 29a. In response thereto, the interrupt signal generating circuit 25a outputs a lower interrupt request signal to the interrupt signal generating circuit 15, and at this time, since no interrupt accept signal is input into the interrupt signal generating circuit 15, the interrupt signal generating circuit 15 outputs a high level, lower interrupt grant signal indicating grant of interrupt to the interrupt signal generating circuit 25a and outputs an interrupt request signal to the CPU 3. In response thereto, since the interrupt signal generating circuit 25a receives an interrupt accept signal, an interrupt enable signal is output to the tri-state output circuit 29a and a low level, lower interrupt grant signal indicating to stop an interrupt operation is output to the interrupt signal generating circuit 25b, thereby inhibiting interrupt at the slave interrupt control circuit 2b.

On the other hand, the CPU 3, in response to an interrupt request signal, outputs an address output designate signal designating an output of a vector address signal to the switching circuit 18 and the tri-state output circuit 19 through the control bus 32 and the address output control circuit 17, to the tri-state output circuit 29a through the control bus 32 and the address output circuit 27a, and also to the tri-state output circuit 29b through the control bus 32 and the address output control circuit 27b. Since an address output designate signal is input but no interrupt enable signal is input, the tri-state output circuits 19 and 29b set output terminals to the address bus 33b at high impedance state. Since an interrupt enable signal and an address output designate singal are input, the tri-state output circuit 29a outputs a vector address signal output from the vector table 26a to the RAM 4 through the address bus 33b. Thus, an interrupt operation corresponding to the interrupt signal from the vector address of the RAM 4 will start.

Figure 3A:
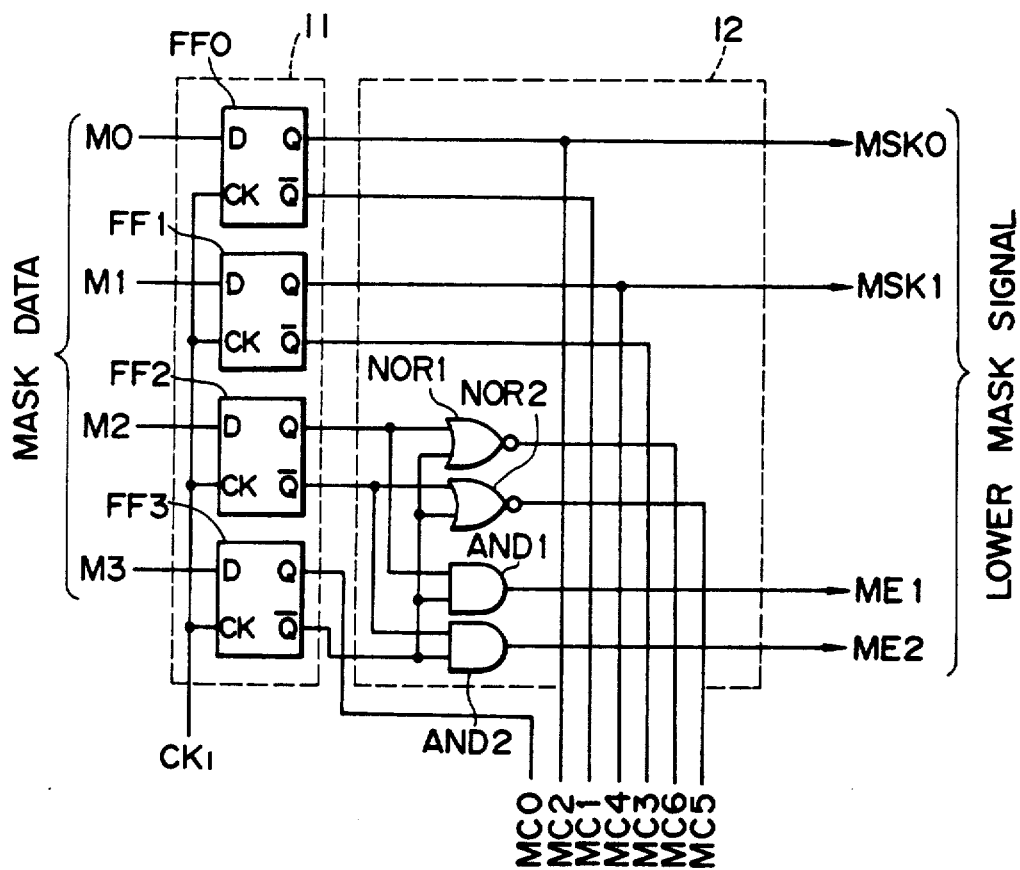
FIGS. 3a and 3b are circuit diagrams showing in detail the mask register, mask control circuit, interrupt input register, priority control circuit and interrupt signal generating circuit provided in the structure shown in FIG. 1.
Figure 3B:
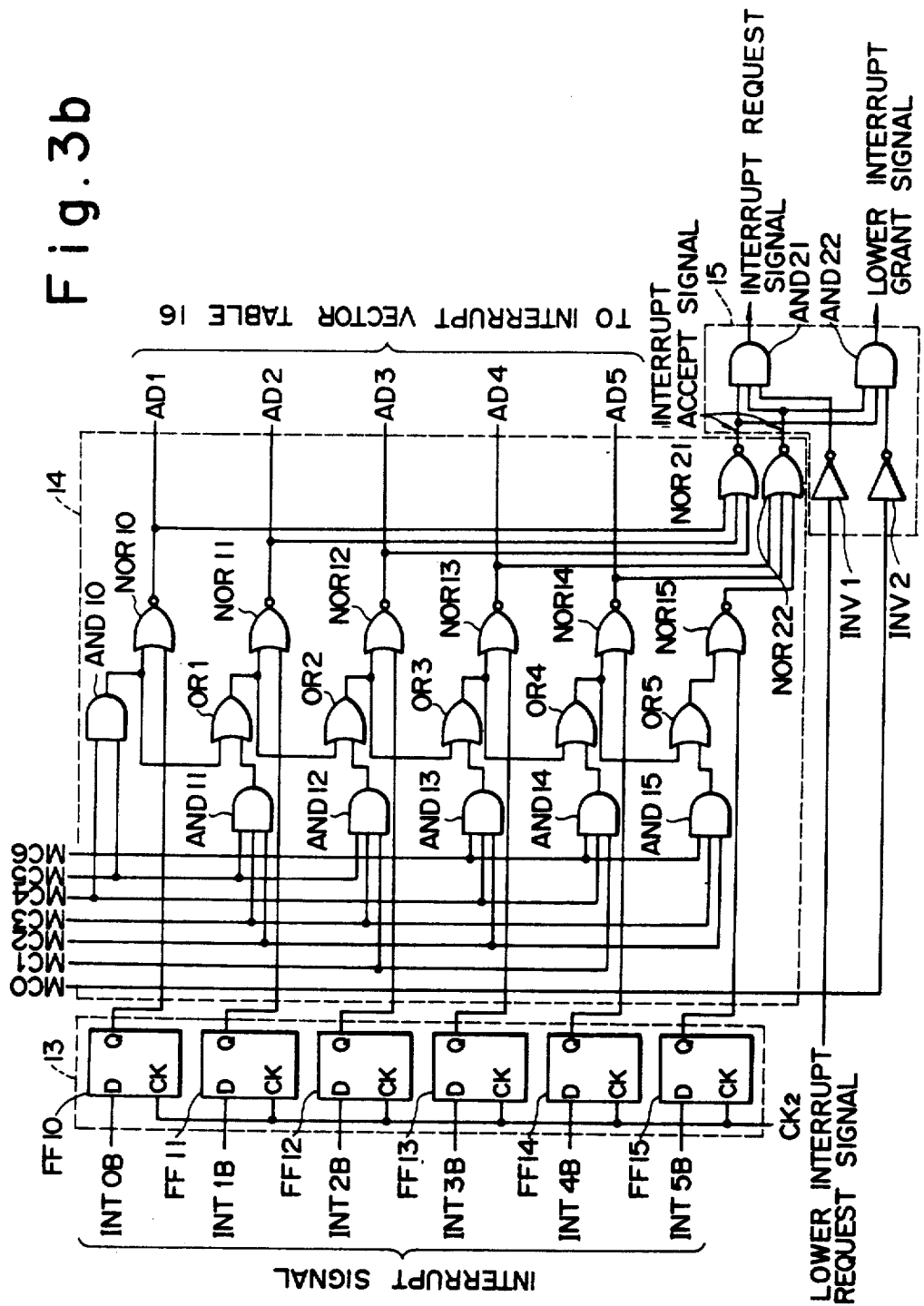

FIG. 3a shows in detail the master register 11 and master control circuit 12 provided in the master interrupt control circuit 1, and FIG. 3b shows in detail the interrupt input register 13, priority control circuit 14 and interrupt signal generating circuit 15 provided in the master interrupt control circuit 1. It is to be noted that like elements are indicated by like numerals throughout the drawings. Seven connection lines MC0 through MC6 shown in FIG. 3a should be understood to be connected to connection lines MC0 through MC6 shown in FIG. 3b.

In FIG. 3a, the mask register 11 is comprised of four D-type flip-flops FF0 through FF3 and the mask control circuit 12 is comprised of two NOR gates NOR1 and NOR2 and two AND gates AND1 and AND2. A clock CK1 output from a clock signal generator (not shown) is input into each of clock terminals CK of the flip-flops FF0 through FF3.

In FIG. 3b, the interrupt input register 13 is comprised of six D-type flip-flops FF10 through FF15, and the priority control circuit 14 is comprised of six AND gates AND10 through AND15, five OR gates OR1 through OR5 and eight NOR gates NOR10 through NOR15, NOR21 and NOR22. The interrupt signal generating circuit 15 is comprised of two inverters INV1 and INV2 and two AND gates AND21 and AND22. Another clock CK2 output from a clock signal generator (not shown) is input into each of clock terminals CK of the flip-flops FF10 through FF15.

Mask data M0 through M3 input from the CPU 3 through the data bus 31 are input into each of the D input terminals of the flip-flops FF0 through FF3. Each of the flip-flops FF0 through FF3 temporarily stores the mask data M0 through M3 input at the rising edge of clock CK1, outputs the mask data M0 through M3 to the Q output terminal and outputs the inverted mask data M0 through M3 to the $\overline{Q}$ output terminal. It should be understood that the operation of each of later-described D-type flip-flops is similar to that described above. Each of signals output from the Q output terminals of the flip-flops FF0 and FF1 is input into the lower mask signal bus 34 as a lower mask signal MSK0 or MSK1.

The Q output terminal of the flip-flop FF0 is connected to each of third input terminals of the AND gates AND12 and AND14, and the Q output terminal of the flip-flop FF1 is connected to each of second input terminals of the AND gates AND11, AND12 and AND15. In addition, the $\overline{Q}$ output terminal of the flip-flop FF0 is connected to each of third input terminals of AND gates AND11, AND13 and AND15. The $\overline{Q}$ output terminal of the flip-flop FF1 is connected to a first input terminal of the AND gate AND10 as well as to each of second input terminals of the AND gates AND13 and AND14.

The Q output terminal of the flip-flop FF2 is connected to each of first input terminals of NOR gate NOR1 and AND gate AND1, and the $\overline{Q}$ output terminal of flip-flop FF is connected to each of first input terminals of NOR gate NOR2 and AND gate AND2. The flip-flop FF3 has its Q output terminal connected to a third input terminal of AND gate AND22 through an inverter INV2 within the interrupt signal generating circuit 15, and the flip-flop FF3 has its $\overline{Q}$ output terminal connected to each of second input terminals of NOR gates NOR1 and NOR2 and each of second input terminals of AND gates AND1 and AND2.

A signal output from each of the output terminals of AND gates AND1 and AND2 is output to the lower mask signal bus 34 as a lower mask signal ME1 or ME2. The output terminal of NOR gate NOR2 is connected to the second input terminal of AND gate AND10, to the first input terminal of AND gate AND 11 and to the first input terminal of AND gate AND12. The output terminal of NOR gate NOR1 is connected to each of the first input terminals of AND gates AND13 and AND15.

Interrupt signals INT0B through INT5B are input into respective D input terminals of flip-flops FF10 through FF15. Each of the Q output terminals of flip-flops FF10 through FF15 is connected to a second input terminal of NOR gates NOR10 through NOR15.

Each of the output terminals of AND gates AND11 through AND15 is connected to each of the second input terminals of OR gates OR1 through OR5. The output terminal of the AND gate AND10 is connected to the first input terminal of NOR gate NOR10 and also to the first input terminal of OR gate OR1. Each of the output terminals of OR gates OR1 through OR4 is connected to a corresponding one of first input terminals of NOR gates NOR11 through NOR14 and to a corresponding one of first input terminals of OR gates OR2 through OR5. Moreover, the OR gate 5 has its output terminal connected to the first input terminal of NOR gate NOR15.

A signal output from each of the outputs of NOR gates NOR10 through NOR14 is output to the interrupt vector table 16 as one of address signals AD1 through AD5 for designating an address in the interrupt vector table 16 corresponding to each of the interrupt signals INT0B through INT5B. Each of the output terminals of NOR gates NOR10 through NOR12 is connected to a corresponding one of first, second and third input terminals of NOR gate NOR21, and each of the output terminals of NOR gates NOR13 through NOR15 is connected to a corresponding one of first, second and third input terminals of NOR gates NOR22. A signal output from the output terminal of NOR gate NOR21 is input as an interrupt accept signal to the first input terminal of AND gate AND21 and also to the second input terminal of AND gate AND22. A signal output from the output terminal of NOR gate NOR22 is input as an interrupt accept signal to the second input terminal of AND gate AND21 and also to the first input terminal of AND gate AND22. A lower interrupt request signal output from the interrupt signal generating circuit 25a of the slave interrupt control circuit 2a is input into the third input terminal of AND gate AND21 through an inverter INV1. A signal output from the output terminal of AND gate AND21 is input into the interrupt input terminal IRQ of CPU 3 as an interrupt request signal. A signal output from the output terminal of AND gate AND22 is input as a lower interrupt grant signal into the interrut signal generating circuit 25a of the slave interrupt control circuit 2a.

As described above, by providing the mask register 11, mask control circuit 12, interrupt input register 13, priority control circuit 14 and interrupt signal generating circuit 15 in the master interrupt control circuit 1, each of these circuits 1 through 15 will operate in a manner similar to that described with reference to FIG. 1.

Figure 4:
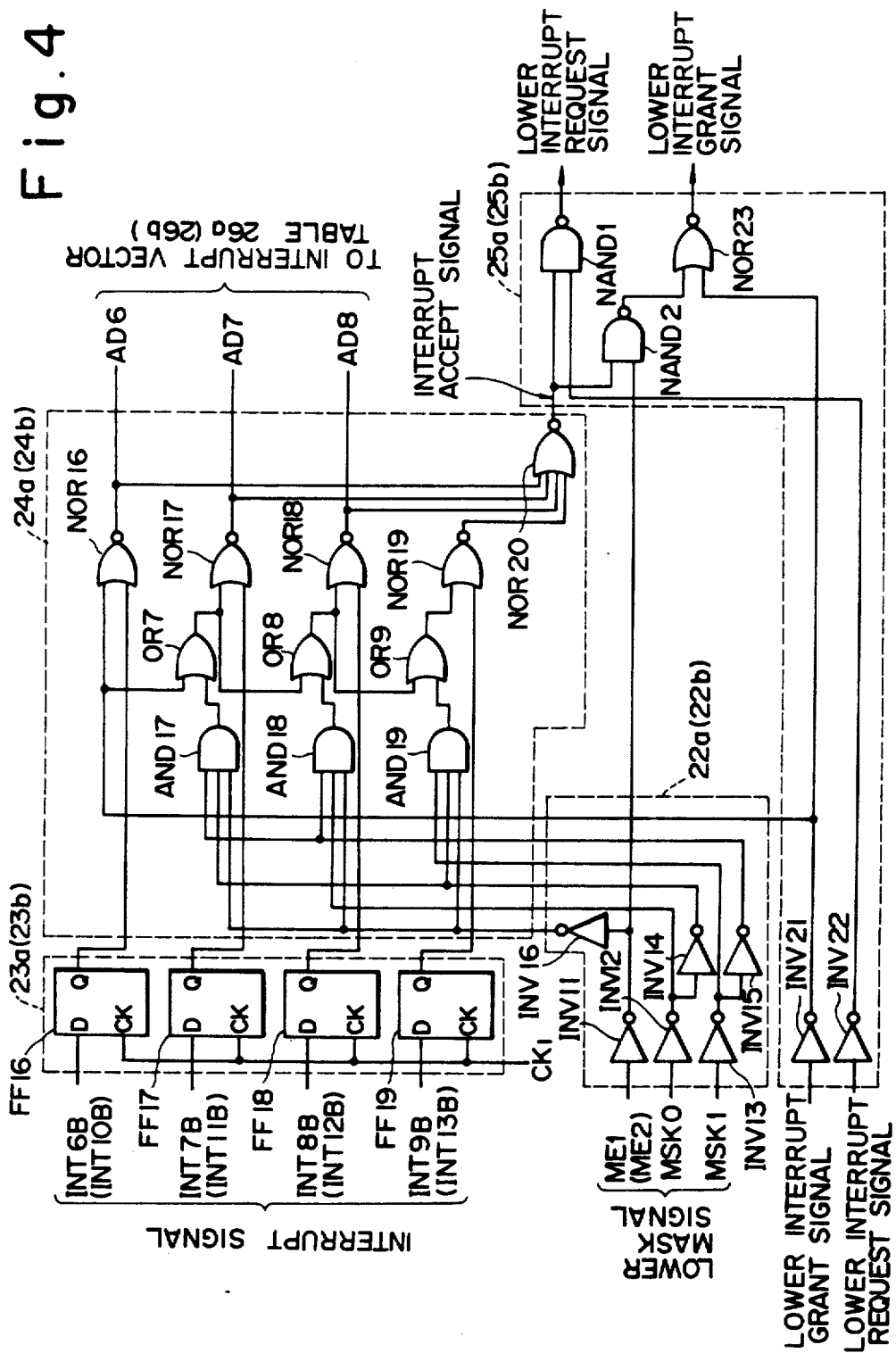
FIG. 4 is a circuit diagram showing in detail the mask control circuit, interrupt input register, priority control circuit and interrupt signal generating circuit provided in the slave interrupt control circuit shown in FIG. 1.

FIG. 4 shows in detail the mask control circuits 22a and 22b, interrupt input registers 23a and 23b, priority control circuits 24a and 24b and interrupt signal generating circuits 25a and 25b in the slave interrupt control circuits 2a and 2b. As set forth before, those elements identical to those described before will be indicated by like elements. The slave interrupt control circuits 2a and 2b are identically constructed, and in FIG. 4, the reference characters in the parentheses correspond to those elements provided in the slave interrupt control circuit 2b. Hereinbelow, only the slave interrupt control circuit 2a will be described because its description is equally applicable to the slave interrupt control circuit 2b.

In FIG. 4, the mask control circuit 22a is comprised of five inverters INV11 through INV15 and the interrupt input register 23a is comprised of four D type flip-flops FF16 through FF19. The priority control circuit 24a is comprised of three AND gates AND17 through AND19, OR gates OR7 through OR9 and NOR gates NOR16 through NOR20, and the interrupt signal generating circuit 25a is comprised of two inverters INV21 and INV22, two NAND gates NAND1 and NAND2 and a NOR gate NOR23. A clock CK1 output from a clock signal generator (not shown) is input into each of the clock terminals CK of flip-flops FF16 through FF19. Interrupt signals INT6B through INT9B are input into the D input terminals of flip-flops FF16 through FF19. Q output terminals of flip-flops FF16 through FF19 are connected to the second input terminals of NOR gates NOR16 through NOR19, respectively.

Lower mask signals ME1, MSK0 and MSK1 output from the mask control circuit 12 of the master interrupt control circuit 1 are input into the mask control circuit 22a through the lower mask signal bus 34. A lower mask signal ME1 is input into the second input terminal of NAND gate NAND2 through an inverter INV11 and also to each of the third input terminals of AND gates AND 17 through AND19 through an inverter INV16. A lower mask signal MSK0 is input into the second input terminal of AND gate AND18 through an inverter INV12 and also to each of the second input terminals of AND gates AND17 through AND19 through an inverter INV14. Furthermore, a lower mask signal MSK1 is input into the first input terminal of AND gate AND19 through an inverter INV13 and also to each of the first input terminals of AND gates AND17 and AND18 through an inverter INV15.

A lower interrupt grant signal output from the interrupt signal generating circuit 15 in the master interrupt control circuit 1 is input through an inverter INV21 to the first input terminal of NOR gate NOR16, to the first input terminal of OR gate OR7 and also to the second input terminal of NOR gate NOR23. A lower interrupt request signal output from the interrupt signal generating circuit 25b in the slave interrupt control circuit 2b is input into the second input terminal of NAND gate NAND1 through an inverter INV22. AND gates AND17 through AND19 have their output terminals connected to respective second input terminals of OR gates OR7 through OR9. The output terminal of OR gate OR7 is connected to the first input terminal of NOR gate NOR17 and also to the first input terminal of OR gate OR8. The output terminal of OR gate OR8 is connected to the first input terminal of OR gate OR9 and also to the first input terminal of OR gate OR9. The output terminal of OR gate OR9 is connected to the first input terminal of NOR gate NOR19.

Signals output from the output terminals of NOR gates NOR16 through NOR18 are output to the interrupt vector table 26a as address signals AD6 through AD8 for designating addresses of the interrupt vector table 26a corresponding to interrupt signals INT6B through INT9B, respectively. Each of the output terminals of NOR gates NOR16 through NOR19 is connected to a corresponding one of the input terminals of NOR gate NOR20. A signal output from the output terminal of NOR gate NOR20 is input as an interrupt accept signal to each of the first input terminals of NAND gates NAND1 and NAND2. The output terminal of NAND gate NAND2 is connected to the first input terminal of NOR gate NOR23. A signal output from the output terminal of NAND gate NAND1 is input as a lower interrupt request signal to the mask control circuit 12 in the master interrupt control circuit 1. A signal output from the output terminal of NOR gate NOR23 is input as a lower interrupt grant signal to the interrupt signal generating circuit 25b within the slave interrupt control circuit 2b.

As described above, by providing the mask control circuit 22a, interrupt input register 23a, priority control circuit 24a and interrupt signal generating circuit 25a in the slave interrupt control circuit 2a, each of the circuits 22a through 25a operates in a manner described with reference to FIG. 1 previously. The mask control circuit 22b, interrupt input register 23b, priority control circuit 24b and interrupt signal generating circuit 25b in the slave interrupt control circuit 2b are constructed in a manner similar to that of FIG. 4 and thus each of the signals in the slave interrupt control circuit 2b is replaced by a corresponding one of the signals in the slave interrupt control circuit 2a as will be described below. That is, the interrupt signals INT6B through INT9B are replaced by interrupt signals INT10B through INT13B, respectively, and the lower mask signal ME1 is replaced by a lower mask signal ME2. The lower interrupt grant signal input from the interrupt signal generating circuit 15 of the master interrupt control circuit 1 is replaced by a lower interrupt grant signal input from the interrupt signal generating circuit 25a of the slave interrupt control circuit 2a, and the lower interrupt request signal input from the slave interrupt control circuit 2b is replaced by a low level signal. The lower interrupt request signal output to the interrupt signal generating circuit 15 in the master interrupt control circuit 1 is replaced by an interrupt request signal output to the interrupt signal generating circuit 25a in the slave interrupt control circuit 2a.

In the above-described embodiment, use has been made of a pair of slave interrupt control circuits 2a and 2b; however, the present invention should not be limited to only such an application, use may be made of only one or three or more slave interrupt control circuits, if necessary. In the case where use is made of three of more slave interrupt control circuits, the number of bits of the mask data and the lower mask signal is required to be five or more, and thus the four interrupt input terminals per slave interrupt control circuit may be increased. For the third or more slave interrupt control circuits, all of them are connected to the rest of the system through the address bus 33b, control bus 32 and lower mask signal bus 34 in a manner similar to that for each of the slave interrupt control circuits 2a and 2b. The number of interrupt input terminals of each of the interrupt control circuits 1, 2a and 2b should not be limited to six, four and four as described above and it may be set in any desired value.

As described above, in accordance with the present invention, since any desired number of one or more slave interrupt control circuits 2a and 2b can be provided for the signal master interrupt control circuit 1, the number of inputs of interrupt signal can be set at any desired value. In addition, since the interrupt control circuits 1, 2a and 2b are provided with interrupt vector tables 16, 26a and 26b, respectively, the present invention can be applied to an indirect address type system as described above. It should also be noted that use has been made of the RAM 4 in the above-described embodiment; however, use may also be made of any other types of memories, such as a ROM.

As set forth above, in accordance with the present invention, since a plurality of interrupt control means for receiving an input interrupt signal and generating a vector address signal corresponding to said interrupt signal and a control means responsive to said input interrupt signal for causing only one of said plurality of interrupt control means corresponding to said interrupt signal to be operative are provided, any desired number of interrupt control means can be provided so as to easily increase or decrease the number of interrupt request signals. Furthermore, since each of the interrupt control means can receive an input interrupt signal and generate a vector address corresponding to the interrupt signal, the present invention can be applied to an indirect address system.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An interrupt control system comprising:
a plurality of interrupt control circuits comprising a master interrupt control circuit and at least one slave interrupt control circuit connected to said master circuit, each control circuit receiving a respective plurality of input interrupt signals and each interrupt control circuit including its own respective interrupt vector table for generating vector addresses corresponding to respective input interrupt signals received by the respective control circuit; and
control means responsive to said input interrupt signals for enabling only the master circuit or only the set of the master circuit and one slave circuit, depending on the contents of said input interrupt signals while disabling the remaining one or more interrupt control circuits;
each of said interrupt control circuits comprising a mask storage storing a mask, an interrupt signal generator generating an interrupt request in response to an input request signal, and a priority control rejecting input interrupt signals which have a first level relative to the mask when an interrupt request signal has been generated by another of said interrupt control circuits in response to an input interrupt signal having a second level relative to said mask.

2. A system as in claim 1 in which each interrupt control circuit includes means for keeping the interrupt control circuit inoperative while there is no input interrupt signal to the interrupt control circuit as well as while an interrupt request signal from another interrupt control circuit is being serviced.

3. A system as in claim 2 including a common address bus to which the interrupt vector tables of the respective interrupt control circuits output said vector addresses and wherein said interrupt control circuits include respective tri-state circuits which presents a high impedance between the common address bus and the respective interrupt control circuits when the respective control circuits are not outputting vector addresses to the common bus.

4. An interrupt control system comprising:
a plurality of interrupt control circuits comprising a master interrupt control circuit and at least one slave interrupt control circuit connected to said master circuit, each control circuit receiving a respective plurality of input interrupt signals and including a respective interrupt vector table for generating vector addresses corresponding to respective input interrupt signals received by the respective control circuit;
control means responsive to said input interrupt signals for enabling only one interrupt control circuit which corresponds to a selected one of said input interrupt signals while disabling the remaining one or more interrupt control circuits;
each of said interrupt control circuits comprising a mask storage storing a mask, an interrupt signal generator generating an interrupt request in response to an input request signal, and a priority control rejecting input interrupt signals which have a first level relative to the mask when an interrupt request signal has been generated by another of said interrupt control circuits in response to an input interrupt signal having a second level relative to said mask;

wherein each interrupt control circuit includes means for keeping the interrupt control circuit inoperative while there is no input interrupt signal to the interrupt control circuit as well as while an interrupt request signal from another interrupt control circuit is being serviced; and a common address bus to which the interrupt vector tables output said vector addresses and wherein said interrupt control circuits include respective tri-state circuits which presents a high impedance between the common address bus and the respective interrupt control circuits when the respective control circuits are not outputting vector addresses to the common bus.

* * * * *